G. H. HULETT.

2 Sheets—Sheet 1.

DEVICE FOR UNLOADING CARS.

No. 11,494.

Reissued May 7, 1895.

Witnesses
E. Nottingham
G. F. Downing

Inventor
G. H. Hulett
By H. A. Seymour
Attorney

G. H. HULETT.

2 Sheets—Sheet 2.

DEVICE FOR UNLOADING CARS.

No. 11,494.

Reissued May 7, 1895.

Witnesses
G. Nottingham
G. F. Downing.

Inventor
G. H. Hulett
By K. A. Seymour
Attorney

UNITED STATES PATENT OFFICE.

GEORGE H. HULETT, OF CLEVELAND, OHIO, ASSIGNOR, BY MESNE ASSIGNMENTS, TO THE McMYLER CAR DUMPING MACHINE COMPANY, OF SAME PLACE.

DEVICE FOR UNLOADING CARS.

SPECIFICATION forming part of Reissued Letters Patent No. 11,494, dated May 7, 1895.

Original No. 516,053, dated March 6, 1894. Application for reissue filed November 2, 1894. Serial No. 527,779.

*To all whom it may concern:*

Be it known that I, GEORGE H. HULETT, of Cleveland, in the county of Cuyahoga and State of Ohio, have invented certain new and useful Improvements in Devices for Unloading Cars; and I do hereby declare the following to be a full, clear, and exact description of the invention, such as will enable others skilled in the art to which it appertains to make and use the same.

My invention relates to an improvement in portable devices for unloading railroad cars and it consists in certain parts and combination of parts as will be more fully described and pointed out in the claims.

Figure 1:
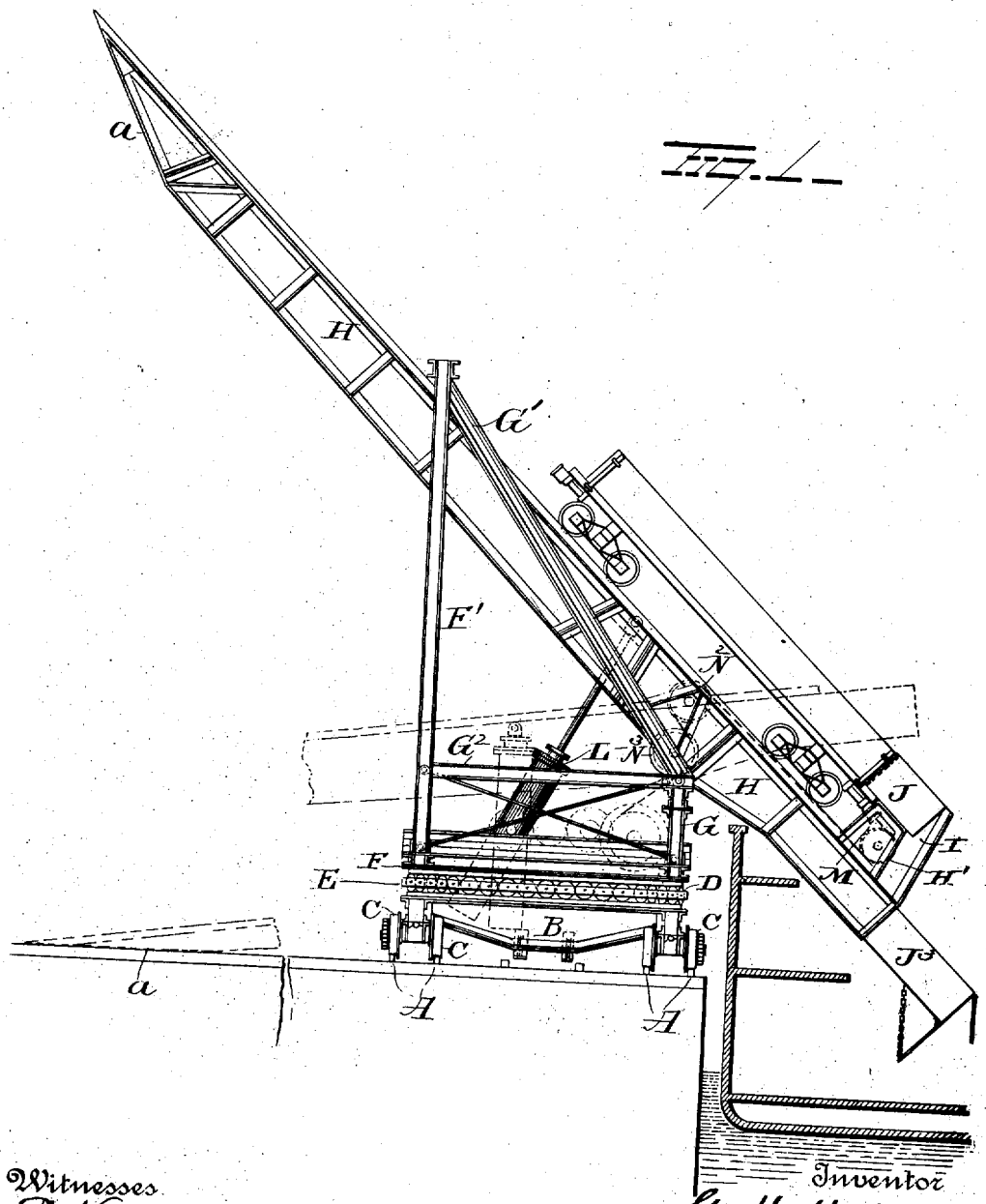
Figure 2:
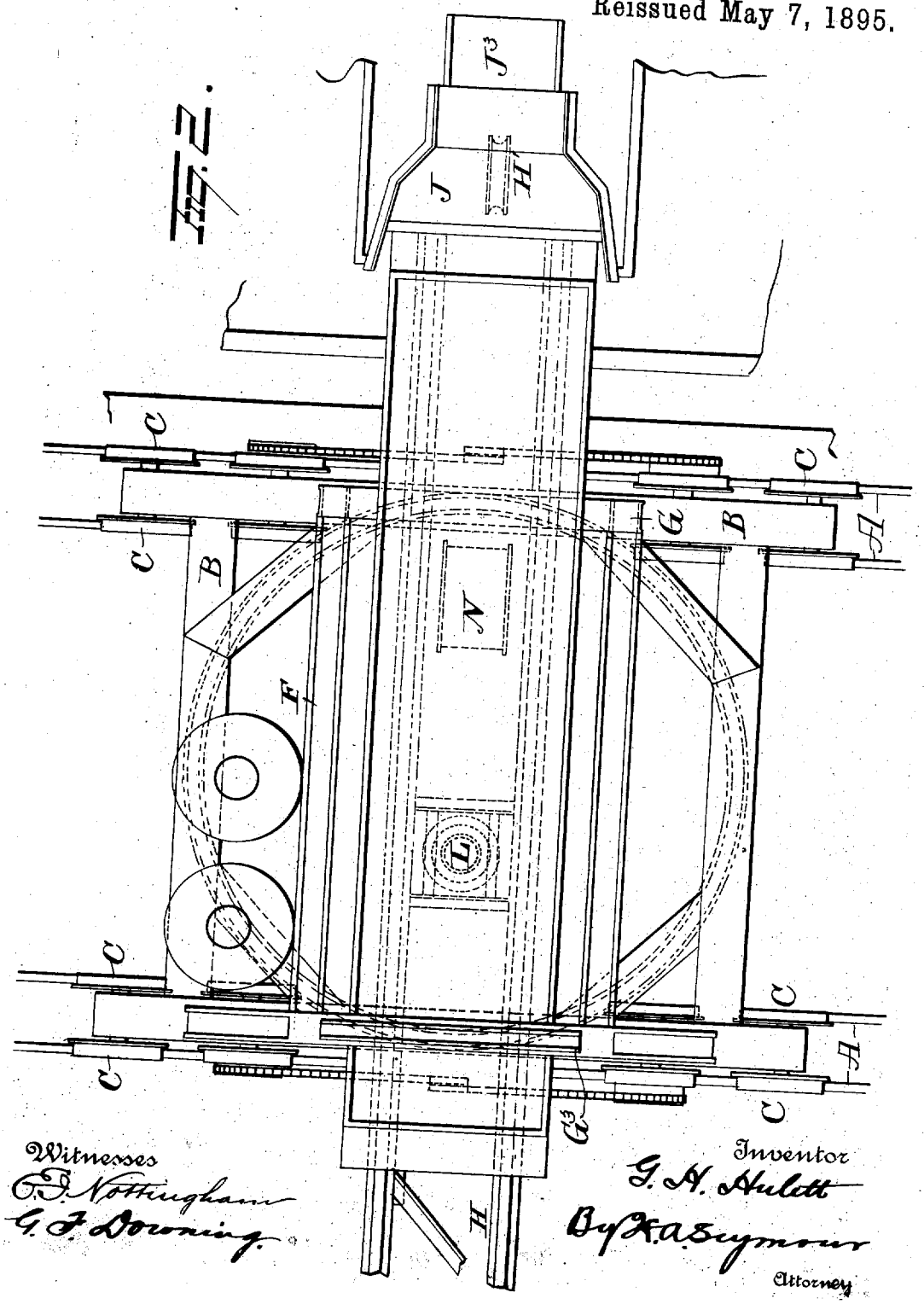

In the accompanying drawings, Figure 1 is a view in side elevation of my improved device, showing a car thereon in the act of discharging its contents into the hold of a vessel; and Fig. 2 is a plan view of same.

A represents a railway constructed to receive the truck B, which latter is mounted on wheels C arranged in pairs, and is adapted to travel back and forth parallel to the pier or water front, as shown, or parallel to bins or other repositories designed to receive coal or material usually carried in bulk. The wheels C are as stated arranged in pairs, each pair constituting in effect a truck, the trucks so formed being pivotally connected to the main truck B, so as to enable the wheels to follow inequalities in the track without straining the parts. This truck B is provided on its upper face with a bearing or way for the rollers D which latter are carried by the ring E. Resting on the rollers D, and secured to the truck by a suitable king bolt or equivalent device is the rotary platform F, which latter carries a suitable engine and boiler, or electric or other motors for actuating the drums and other movable parts. The platform is rotated by means of the rack and pinion ordinarily employed for that purpose, and is provided with the uprights F′ and G, the former being considerably longer or higher than the latter and connected thereto by the braces $G^1$, $G^2$. The two shorter uprights G are connected together at the tops and at intermediate points if desired, while the uprights F′ are also connected at their tops by the braces $G^3$.

Pivotally mounted on the upper ends of the shorter uprights G is the inclined platform H, which latter consists of preferably two parallel girders located a proper distance apart and connected at intervals throughout their length forming in effect a platform. The platform thus formed is provided with rails, and is beveled at *a* so that when in the position shown in dotted lines the beveled ends of the rails will rest on the rails of the surface track and form a continuation thereof, so that a car on the surface track can, by the mechanism to be hereinafter described, be drawn over the unobstructed end of the track on the platform, discharged of its contents, and lowered onto the same or onto another track.

The platform H is pivoted to one side of its longitudinal center, as shown, and is provided at its outer or shorter end with a bumper or buffer I, and adjacent to the latter is the mouth of the discharging chute J. This chute J communicates with a telescopic trough or spout $J^3$ carrying at its free end movable gates, which latter direct the coal or other contents of the car to any part of the hold or bin. These gates are actuated by ropes or chains under the control of the operator, whereby the discharge can be regulated both as to quantity and direction.

After the car has been discharged of its load, the platform is tilted so as to carry the end thereof well out of the hold or bin, and the rotary platform is then turned so as to bring the beveled end of the tilting platform over a track onto which the empty cars are run. The platform is then lowered onto said track and the empty car lowered, after which the platform is turned to the track having the loaded cars thereon, and another one carried up and discharged, as described.

L is a hydraulic cylinder pivotally or loosely mounted on platform F and provided with a plunger, the free end of which is connected to the tilting platform as shown. By means of this plunger and suitable means for forcing water therein the tilting platform can be raised from the position shown in dotted lines, Fig. 1, to the position shown in full lines in the same figure. By permitting the water to escape from the hydraulic cylinder the opposite end of the platform is lowered onto the track.

The platform H is provided with a sheave H′, around which passes chain M. The free end of this chain is adapted to be attached to the car coupler, while the opposite end thereof is secured to the drum N after passing around sheaves $N^2$ $N^3$. Thus when the platform is in the position shown in dotted lines, and the chain M attached to a car the rotation of the drum N which is actuated by a suitable motor causes the car to move up the incline until it comes in contact with the buffer. The drum is then locked against rotation, and the platform tilted by the mechanism previously described.

By mounting the tilting platform on a truck the entire apparatus can be moved lengthwise the vessel so as to bring the discharging end thereof over the several hatchways, thus permitting the entire cargo to be stored without shifting the boat, and by pivoting the platform nearer its discharging end, a preponderance of weight is on the receiving side of the platform, so that in the event of breakage of any of the parts, the platform instead of toppling toward the vessel and depositing the car thereon would fall toward land thus permitting the car to run onto land.

I would have it understood that I do not confine myself to details of construction, but consider myself at liberty to make such changes and alterations as fairly fall within the spirit and scope of my invention.

Having fully described my invention, what I claim as new, and desire to secure by Letters Patent, is—

1. In a portable device for unloading cars, the combination with a truck and a rotary platform mounted thereon, of a lengthwise tilting platform pivoted at one side of its longitudinal center to the rotary platform, and provided with a track on which cars may be run and supported, the tilting platform and rotary platform being constructed to allow the end of the long arm of the tilting platform to be depressed to rest on the adjacent track below the platform, and suitable means for drawing a car upwardly on the platform when in such inclined position, substantially as set forth.

2. In a portable device for unloading cars, the combination with a truck and a rotary platform mounted thereon, of a lengthwise tilting platform pivoted at one side of its longitudinal center to one side of the rotary platform, and provided with a track on which cars may be run and supported, the tilting platform being constructed to allow the end of the long arm thereof to be depressed to rest on the adjacent track below the platform, and suitable means for drawing a car upwardly on the platform when in such inclined position.

3. In a portable device for unloading cars, the combination with a truck and a rotary platform mounted thereon, of a lengthwise tilting platform pivoted to the rotary platform, a buffer secured to the short arm of the tilting platform and a hopper located on the buffer and a chute connected with the hopper, substantially as set forth.

4. In a device for unloading cars, the combination with a rotary platform, of a lengthwise tilting platform mounted on the rotary platform, said tilting platform being pivoted at one side of its longitudinal center and its longer arm constructed of sufficient length to extend below the level of the rotary platform, means for drawing a car onto and up said inclined platform, a buffer near the free end of the shorter arm of said inclined platform, a chute carried by said platform through which the material is discharged, and means for tilting the platform endwise.

5. In a device for unloading cars, the combination with an inclined platform pivoted at one side of its longitudinal center and provided with a track on which cars may be run and supported, the said platform being constructed to allow the free end of the long arm thereof to be depressed below the plane of the axis of the platform to rest on an adjacent track, of a buffer located near the free end of the shorter arm of the platform, a chute through which the material is discharged and a sliding trough carried by the shorter arm of the platform and adapted to receive the material as it falls from the chute, substantially as set forth.

6. In a portable device for unloading cars, the combination with a truck and a rotary platform thereon, of a lengthwise tilting platform pivotally mounted on the rotary platform and having a track unobstructed at one end on which a car may be run, the said tilting platform being designed to receive a car when the unobstructed end of the truck is lowered, and discharge its contents when tilted in the opposite direction.

7. In a portable device for unloading cars, the combination with a truck and a rotary platform thereon, of a lengthwise tilting platform pivoted to one side of its center, and provided with a track, unobstructed at one end on which a car may be run and having a buffer at its other end, the said tilting platform carrying a discharge chute at the end carrying the buffer, the said tilting platform being designed to receive a car when the unobstructed end of the track is lowered and discharge its contents by tilting in the opposite direction.

In testimony whereof I have signed this specification in the presence of two subscribing witnesses.

GEORGE H. HULETT.

Witnesses:
S. G. NOTTINGHAM.
A. W. BRIGHT.